(12) United States Patent
Karlsen

(10) Patent No.: US 10,725,287 B2
(45) Date of Patent: Jul. 28, 2020

(54) IMAGE ROTATION COMPENSATION FOR MULTIPLE BEAM MATERIAL PROCESSING

(71) Applicant: nLIGHT Photonics Corporation, Vancouver, WA (US)

(72) Inventor: Scott R. Karlsen, Battle Ground, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 13/915,509

(22) Filed: Jun. 11, 2013

(65) Prior Publication Data
US 2014/0362426 A1 Dec. 11, 2014

(51) Int. Cl.
G02B 26/10 (2006.01)

(52) U.S. Cl.
CPC .................... *G02B 26/101* (2013.01)

(58) Field of Classification Search
CPC ............... G02B 26/08; G02B 26/0808; G02B 26/0816; G02B 26/0833–0866; G02B 26/0875; G02B 26/0883; G02B 26/0391; G02B 26/10; G02B 26/105; G02B 26/106; G02B 26/108; G02B 26/0891; G02B 26/127; G02B 27/0031; G02B 27/0068
See application file for complete search history.

(56) References Cited

U.S. PATENT DOCUMENTS

| 4,165,149 A * | 8/1979 | Suzki ................... G03F 9/7088 356/400 |
| 4,176,925 A | 12/1979 | Kocher et al. |
| 4,815,067 A | 3/1989 | Webster et al. |
| 5,214,528 A | 5/1993 | Akanabe et al. |
| 6,245,590 B1 * | 6/2001 | Wine .................. G02B 26/0833 438/14 |
| 6,347,171 B1 | 2/2002 | Tatah et al. |

(Continued)

FOREIGN PATENT DOCUMENTS

| CN | 101055431 | 10/2007 |
| JP | 2009021597 | 1/2009 |
| KR | 100225696 | 10/1999 |

OTHER PUBLICATIONS

First Office Action (with English translation) from related Chinese Application No. 10-2014-10237270.4, dated Aug. 5, 2015, 4 pages.

(Continued)

*Primary Examiner* — Cara E Rakowski
(74) *Attorney, Agent, or Firm* — Klarquist Sparkman, LLP

(57) ABSTRACT

An image compensated multi-beam system includes a beam splitter configured to receive an input light beam and split the input light beam into a plurality of processing light beams, beam scanning optics configured to receive the plurality of processing light beams and to scan the beams at a target, and an image compensation subsystem configured to selectively adjust the rotation of an image of the plurality of processing light beams at the target. A method for compensating a multi-beam image includes splitting an input light beam into a plurality of processing light beams with a beam splitter, scanning the plurality of processing light beams across a target with beam scanning optics, and selectively adjusting the rotation of an image of the plurality of processing light beams at the target.

26 Claims, 3 Drawing Sheets

(56) References Cited

U.S. PATENT DOCUMENTS

| | | |
|---|---|---|
| 6,552,301 B2 | 4/2003 | Herman et al. |
| 6,686,586 B2 | 2/2004 | Check |
| 6,720,519 B2 | 4/2004 | Liu et al. |
| 7,227,115 B2 | 6/2007 | Check |
| 7,366,378 B2 | 4/2008 | Jia et al. |
| 7,397,596 B2 | 7/2008 | Yacoubian |
| 7,534,994 B2 | 5/2009 | Check |
| 7,666,759 B2 | 2/2010 | Couch et al. |
| 8,178,818 B2 | 5/2012 | Baird et al. |
| 2003/0043441 A1 | 3/2003 | Azami et al. |
| 2003/0140806 A1 | 7/2003 | Sandstrom |
| 2003/0151821 A1* | 8/2003 | Favalora ............ G02B 26/106 359/619 |
| 2005/0018289 A1* | 1/2005 | Yanowitz .......... G02B 26/0875 359/462 |
| 2006/0065640 A1* | 3/2006 | Lizotte .............. B23K 26/0604 219/121.61 |
| 2006/0119692 A1 | 6/2006 | Yang et al. |
| 2006/0205121 A1 | 9/2006 | Couch et al. |
| 2007/0295921 A1 | 12/2007 | Check |
| 2008/0127031 A1* | 5/2008 | Olsson ............... G03F 7/70283 716/54 |
| 2009/0109561 A1* | 4/2009 | Cook .................. G02B 7/1821 359/861 |
| 2009/0219607 A1* | 9/2009 | Saggau ............. G02B 21/0016 359/305 |
| 2009/0242522 A1 | 10/2009 | Baird et al. |
| 2009/0289042 A1* | 11/2009 | Ueda ................... G02B 26/101 219/121.72 |
| 2010/0142757 A1* | 6/2010 | Sandstrom et al. .......... 382/100 |
| 2010/0177531 A1* | 7/2010 | Ostlund ................ H04M 1/22 362/555 |
| 2011/0210105 A1* | 9/2011 | Romashko ......... B23K 26/0732 219/121.72 |
| 2011/0216302 A1 | 9/2011 | Luberek |
| 2015/0301455 A1* | 10/2015 | Schlesener .......... G03F 7/70058 355/67 |
| 2018/0227567 A1* | 8/2018 | Chao .................... H04N 13/254 |

OTHER PUBLICATIONS

Notice of Preliminary Rejection (with English translation) from related Korean Application No. 10-2014-0070756, dated Sep. 30, 2015, 7 pages.

Second Office Action (with English translation) from related Chinese Application No. 10-2014-10237270.4, dated Mar. 10, 2016, 8 pages.

Notice of Preliminary Rejection (with English translation) from related Korean Application No. 10-2014-0070756, dated Apr. 26, 2016, 8 pages.

Bass, Michael, Chapter 30 "Scanners", Handbook of Optics vol. 1, New York USA 3rd Ed., pp. 30.35-30.36, McGraw Hill, New York, USA.

Notice of Allowance (with English translation) from related Chinese Application No. 201410237270.4, dated Nov. 3, 2016, 4 pages.

Notice of Allowance (with English translation) from related Korean Application No. 10-2014-0070756, dated Nov. 10, 2016, 3 pages.

"Galvanometer," Https://en.Wikipedia.org/wiki/Galvanometer, 6 pages. Wikipedia, Author unknown, Downloaded Jun. 30, 2017. "Exhibit A".

"Voice Coil Positioning Stage Specifications", 2 pages. Downloaded from https://www.h2wtech.com/pdf/2014-06-02-23-11-26. PDF Jun. 30, 2017. H2W Technologies, Inc., Author unknown, (Dec. 2011). "Exhibit B".

Mitchell, et al., "Fast Steering Mirror Technology: Active Beam Stabilization," Application Note, Opto-Mechanics 2, Newport Corporation, 7 pages (Jan. 2001). "Exhibit C".

* cited by examiner

IMAGE ROTATION COMPENSATION FOR MULTIPLE BEAM MATERIAL PROCESSING

BACKGROUND OF THE INVENTION

1. Field of the Invention

Generally, the field of the present invention is multiple beam material processing. More particularly, the present invention relates to image correction associated with multiple beam material processing.

2. Background

Lasers have enjoyed greater success due in part to the breadth of applications in which laser attributes, such as high energy and high precision attributes, offer substantial improvement. In some applications, the ability for a processing beam to become split into several processing beams is particularly advantageous. For example, in U.S. Pat. No. 8,178,818 to Baird et al., a laser processing system splits a pulsed laser beam into multiple beamlets and controllably modulates the amplitudes thereof. The system delivers the modulated array of beamlets to a target for processing thereof. Applications include drilling, cutting, scribing, and trimming, for micro devices, such as computer memory. In another example, U.S. Pat. No. 7,666,759 to Couch et al., a method and system are described for precise micromachining an array of circuit elements with a beam that is split into multiple beams which are then aligned with the array of circuit elements. Precisely directing multiple beams to a target remains a challenge in the multi-beam processing industry, particularly as process requirements and tolerances become heightened for increasingly complex and refined device technology. Thus, a need remains for improvements in the area of multi-beam material processing.

SUMMARY OF THE INVENTION

According to one aspect of the present invention, an image compensated multi-beam system includes a beam splitter configured to receive an input light beam and split the input light beam into a plurality of processing light beams, beam scanning optics configured to receive the plurality of processing light beams and to scan the beams at a target and an image compensation system configured to selectively adjust the rotation of an image of the plurality of processing light beams at the target. The input light is preferably from a pulsed laser source and the plurality of processing light beams is suitable for materials processing purposes. The selective rotational adjustment of the image can be used to correct a rotational error introduced by operation of the beam scanning optics. In some examples the selective rotational adjustment can be achieved through controlled rotation of the beam splitter or a separate image rotation optic.

According to another aspect of the present invention, a method for compensating a multi-beam image includes splitting an input light beam into a plurality of processing light beams with a beam splitter, scanning the plurality of processing light beams across a target with beam scanning optics, and selectively adjusting the rotation of an image of the plurality of processing light beams at the target. The input light beam is preferably a pulsed laser beam and the plurality of processing light beams is suitable for materials processing purposes. The selective adjustment of the image can be used to correct a rotational error introduced by operation of the beam scanning optics. In some examples the selective adjusting of the rotation can be achieved through controlled rotation of the beam splitter or a separate image rotation optic.

The foregoing and other objects, features, and advantages will become more apparent from the following detailed description, which proceeds with reference to the accompanying figures which are not necessarily drawn to scale.

DETAILED DESCRIPTION OF THE INVENTION

Figure 1:
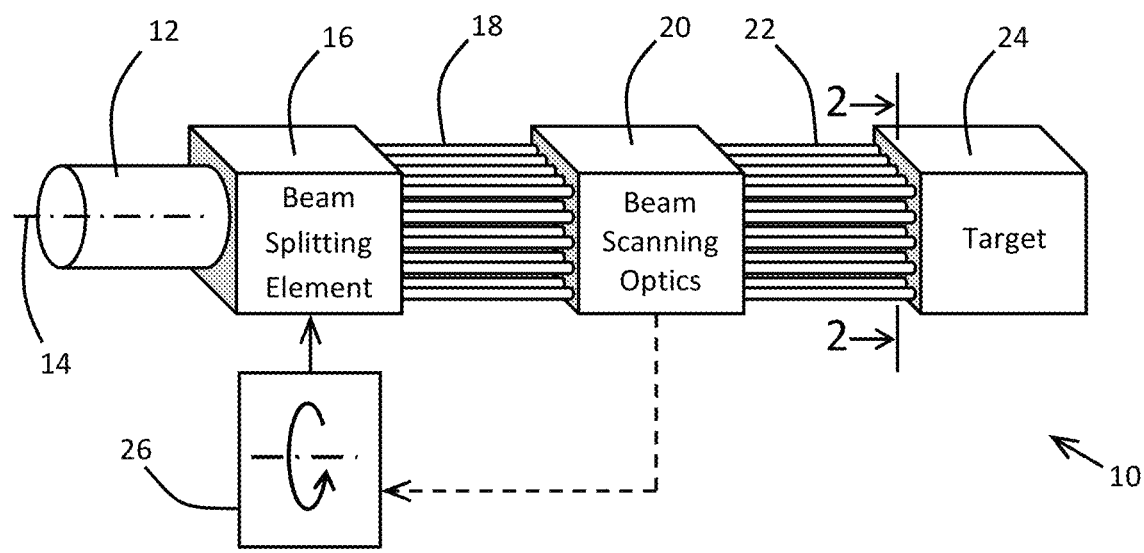
FIG. 1 is a schematic representation of an exemplary embodiment of a multi-beam material processing system with image compensation in accordance with an aspect of the present invention.

Referring to FIG. 1, an exemplary embodiment of an image compensated multi-beam system 10 is shown in schematic form in accordance with one aspect of the present invention. The imaging apparatus 10 includes an input light beam 12, preferably from pulsed laser source (not shown), propagating along an optical axis 14, a beam splitter 16, beam scanning optics 20, and an image compensation subsystem. The light beam 12 is incident on the beam splitter 16 which in preferred examples is a diffractive optical element operable to diffract the input light beam 12 into a plurality of individual light beams 18. In other examples, beam splitter 16 can provide multiple beams with one or more lens arrays, polarizing or non-polarizing beam splitter cubes or plates, arrays of cubes or plates, or other beam splitting techniques as appropriate for the application.

Beam scanning optics 20 are optically coupled to the plurality of individual light beams 18 and configured to scan the beams 18 in a predetermined manner. In preferred examples the beam scanning optics 20 include a galvo scanner having a pair of rotatable mirrors operable to redirect the beams so that the position of the beams 18 translates transversely with respect to the propagation paths. The scanned beams 22 are directed to a selected target 24 and imaged thereon. The beam splitter 16 is controllably rotated by a rotation controller 26 of the image compensation subsystem in concert with the scanned translation of the beams 18 provided by the beam scanning optics 20. In some examples the beam scanning optics 20 can include a Risley prism pair, one or more piezo or voice coil actuated fast-steering mirrors, or an acousto-optic modulator.

Figure 2:
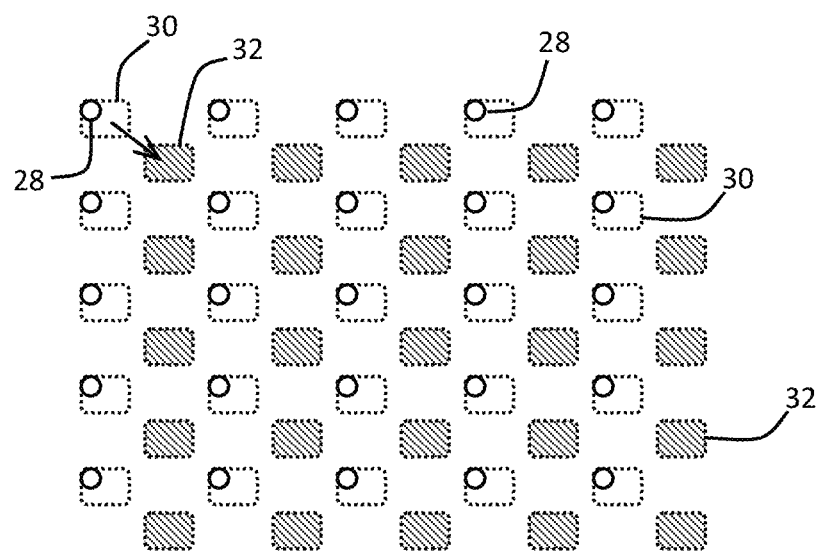
FIG. 2 is simplified representation of an image of multiple beams at a target.

The beam splitter 16 can be configured or selected so as to provide a predetermined array of individual light beams 18 based on the requirements of the application or system. For example, as shown in FIG. 1, and with additional reference to FIG. 2 showing a simplified representation of a cross-sectional image of the beams 18 as individual beam spots 28, the plurality of light beams 18 is a five by five ordered array of individual beams (and corresponding spots). In other examples different beam patterns are used, such as different array ratios, spacings, shapes, etc. The beam spots 28 are scanned in a predetermined fashion across respective processing areas 30. Thus, multiple beams can be used to process a target surface simultaneously for efficient pattern formation, hole drilling, etc. Processing areas 30 typically have tight tolerances associated with area boundaries thereof and which can be on the order of tens of microns or less. In some examples, the multiple beams remain in tolerance while scanning one set of processing areas but then one or more spots 28 may exceed an allowed tolerance, if not corrected, after the spots 28 translate to process an adjacent or nearby set of processing areas 32.

The FIG. 1 schematic representation of the multiple beam system 10 is simplified to show features and aspects of the present invention and corresponding cooperative relations thereof. It will be appreciated in the art of multi-beam systems that additional optical elements may be disposed in relation to the input beam 12, multiple beams 18, and the scanned versions 22 thereof to reflect, refract, image, adjust, or otherwise process the beams 12, 18, 22, without departing from the spirit and scope of the present invention. For example, the beams 22 can be telecentrically imaged to the target 24 with an f-theta lens. The various beams can be specularly reflected with one or more mirrors or relayed with one or more optical relay lenses. As the number of optical elements that are disposed in the propagation path of the beams increases, additional alignment, aberration, thermal, mechanical, and other errors tend to be cumulatively introduced into the multi-beam system. With the increased complexity and tight tolerances of beams and processing areas, errors can be increasingly difficult to correlate and eliminate.

Figure 3:
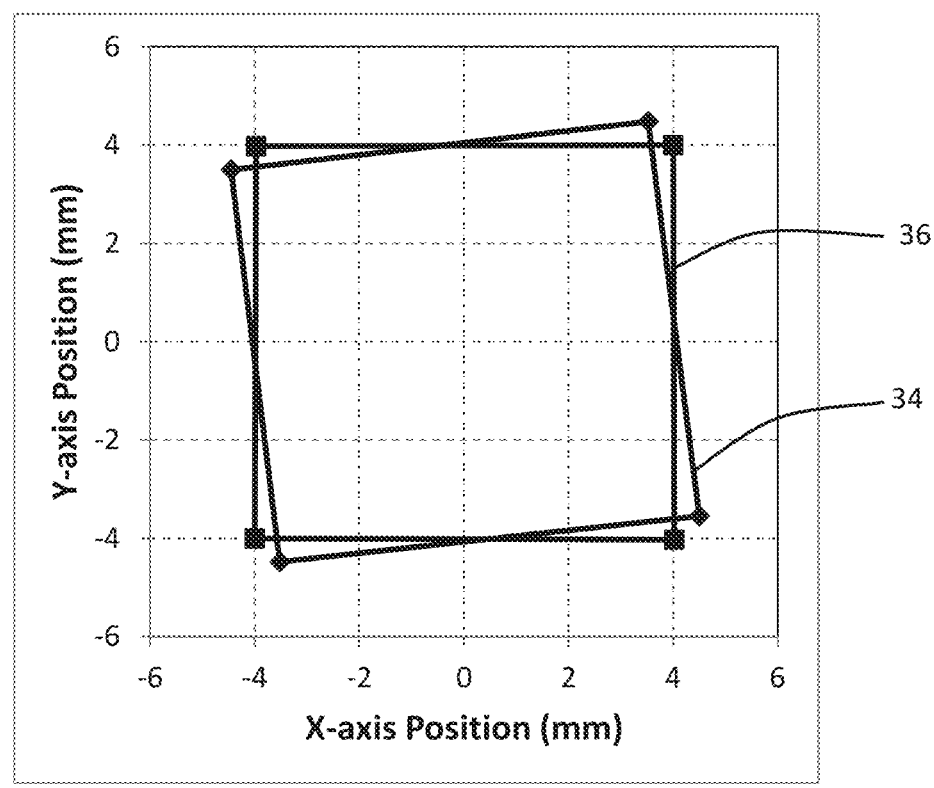
FIG. 3 is a chart of an image rotation error correction in accordance with an aspect of the present invention.

One such error which can go undetected can be attributed to the very small angle through which scan mirrors of the beam scanning optics 20 are rotated. Referring to FIG. 3, a chart is shown which exaggerates a rotational error correction addressed by various aspects of the present invention. An uncorrected beam spot array area 34 is shown having four corners which are not aligned with precision along a +/−4 mm square. Area 34 is an exaggerated prediction of rotation error experienced by the array image of spots 28 depicted in FIG. 2 when the array of spots is translated by the beam scanning optics 20 into an out of tolerance position. The rotation error appears as a counter-clockwise rotation of several degrees. In typical examples, the amount of rotation error experienced in a system attributable to the beam scanning optics 20 is relatively small, such as less than a few degrees, less than one degree, or less than 0.1 degree. The rotation error may be clockwise or counter-clockwise depending on the direction and the distance of the beam translation.

An adjusted beam spot array area 36 is also shown in FIG. 3 which has four corners which are aligned with precision along a +/−4 mm square. The adjusted beam spot array area 36 has been rotated clockwise into a correct alignment through synchronized rotation of the beam splitter 16 by rotation controller 26. It can be additionally convenient to provide rotation adjustment through the beam splitter 16 since a motorized rotation stage may already be coupled thereto for precisely aligning the beams 18 with the target 24. Thus, in various examples, the beam splitter 16 can be counter-rotated with respect to an image rotation caused by the beam scanning optics 20 or other components of the multi-beam system 10.

The controller 26 can provide rotation of the beam splitter 16 in various ways. For example, a signal including information relating to mirror position (or other value) of the beam scanning optics 20 can be received by the controller 26. The mirror position signal can be based on a control signal sent to the servos controlling the scan mirrors of the beam scanning optics 20 or based on a detection signal sent to the controller 26 formed by detecting the mirror position. In still other examples, a pattern file containing scanning data for the beam scanning optics 20 can also be used to control the counter-rotation applied to the beam splitter 16. For example, the pattern file data can be sent both to controller 26 and to beam scanning optics 20.

The controller 26 can counter-rotate the beam splitter 16 by a predetermined or calculated amount in a continuous fashion or discretely as well. Also, in some examples the counter-rotation is applied only after a threshold value associated with the beam scanning optics 20 is reached, such as a threshold mirror position or angle or combination of mirror positions or angles. A threshold value can also be determined or calculated from the tolerance for misalignment of the particular pattern file or scan pattern that is used. Threshold values or rotation relations can also be determined heuristically through operation of the multi-beam apparatus 10. Thus, additional rotational error or other aberration introduced by other optical components can be reduced through visual comparison of processed targets and adjustment of rotation parameters of controller 26.

Figure 4:
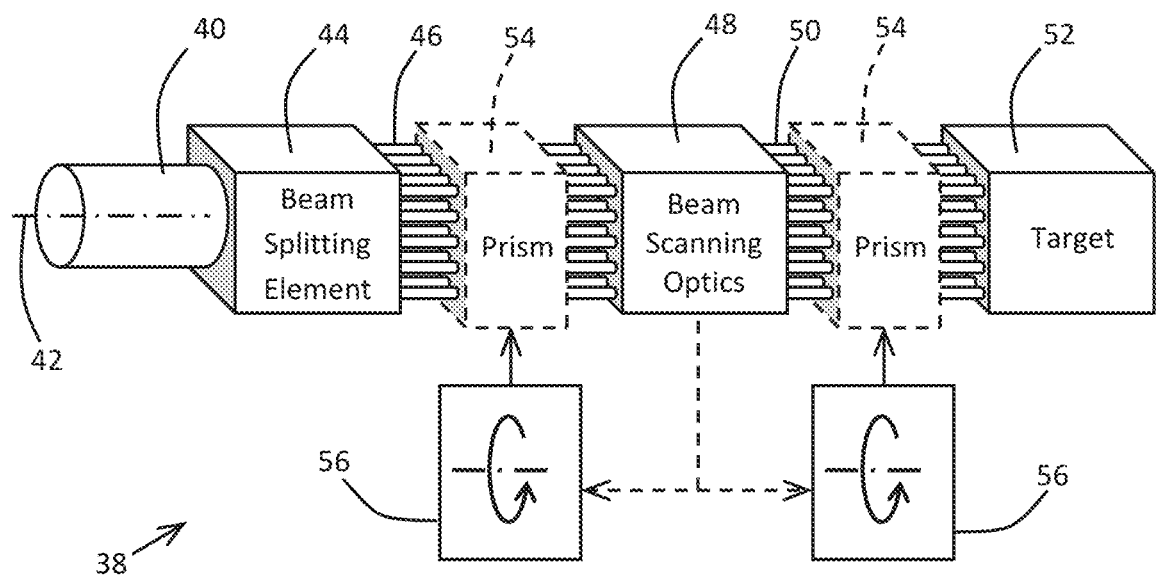
FIG. 4 is a schematic representation of an alternative exemplary embodiment of a multi-beam material processing system with image compensation in accordance with another aspect of the present invention.

In FIG. 4 an alternative exemplary embodiment of an image compensated multi-beam system 38 is shown in schematic form in accordance with another aspect of the present invention. The multi-beam system 38 includes an input light beam 40 propagating along an optical axis 42, a beam splitter 44, beam scanning optics 48, an image rotation optic 54 at least before or after the beam scanning optics 48, and an image compensation subsystem. The input light beam 40 is preferably pulsed and of high power, suitable for various material processing applications. The input light beam 40 is incident on the beam splitter 44 which is operable to split the input light beam 40 into a plurality of individual light beams 46. Beam scanning optics 48 are optically coupled to the plurality of individual light beams 46 and configured to scan the beams 46 in a predetermined manner. In preferred examples the beam scanning optics 48 include a galvo scanner having a pair of rotatable mirrors operable to redirect the beams so that the position of the beams 46 and corresponding image thereof translates transversely with respect to the propagation paths. The scanned beams 50 are directed to a selected target 52 and imaged thereon.

As mentioned, the multi-beam system 38 also includes a separate image rotation optic 54 disposed in the optical path of the split beams 46 or the scanned beams 50. The image rotation optic 54 is depicted with a dashed line to indicate that the position can be before or after the beam scanning optics 48. Image rotation optic 54 can be disposed in both locations if desired, though a second image rotation optic is generally not necessary. The image rotation optic 54 is optically coupled to the beams 46 or beams 50 and is configured to rotate the respective beams with respect to respective propagation paths. The image rotation optic 54 is coupled to a rotation controller 56 of the image compensation subsystem and controllably rotated in concert with the scanned translation of the beams 46 provided by the beam scanning optics 48. The image rotation optic 54 can be selected from several suitable types. For example, Dove prisms, Pechan prisms, roofless Abbe prisms, cylinder lens telescopes, and 3 mirror reflective versions of a roofless Abbe prisms are each possible, though not exhaustive, alternatives. Other aspects of the system 38 can be similar to image compensating multi-beam system 10.

Figure 5:
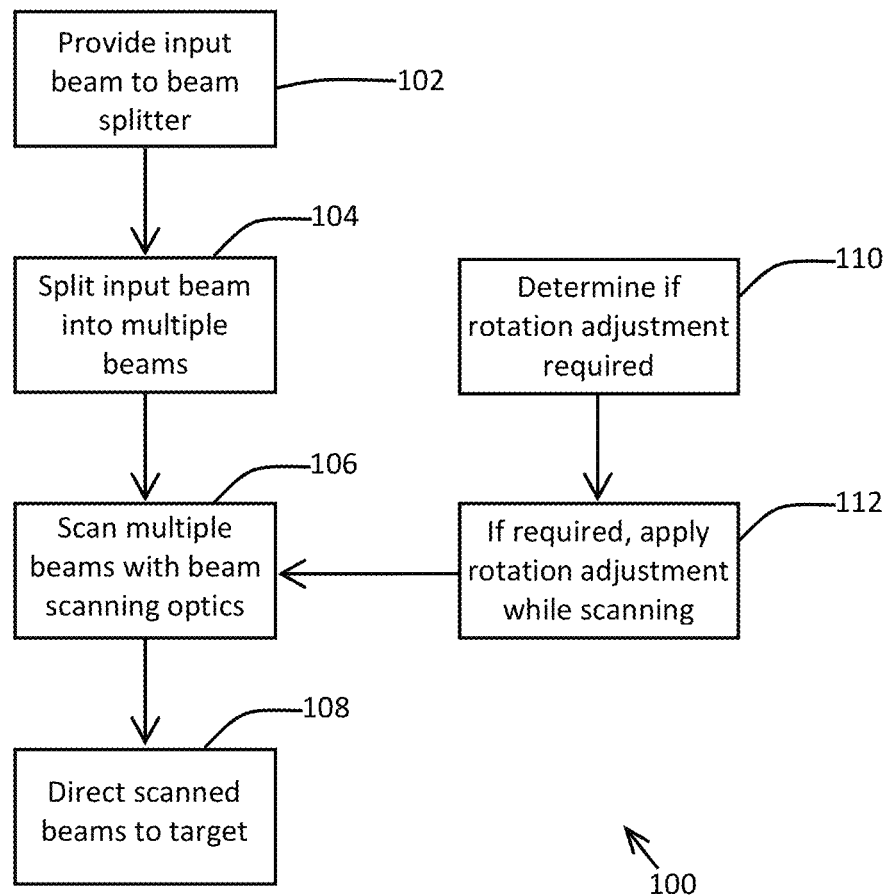
FIG. 5 is a block diagram of a multi-beam image compensating method in accordance with another aspect of the present invention.

An example of a multi-beam image compensating method in accordance with the present invention is shown in the flowchart diagram in FIG. 5, and generally designated 100. The various steps thereof may be performed concurrently or close to concurrently. In a first block 102 an input beam is provided, preferably from a high power pulsed laser source, and directed to a beam splitter. In second block 104 the input beam is split by the beam splitter. Suitable beam splitters include diffractive optical elements which can be configured to diffract the input beam or portions thereof into a plurality of individual processing beams. Arrays of beams can be split, such as by diffraction, into a rectangular configuration or into other shapes as well. In third block 106 the split beams are received by beam scanning optics and scanned therewith in a predetermined way. In fourth block 108 the scanned beams are directed to a target to process the material thereof.

In connection with the scanning of the beams per block 106, in a fifth block 110 a determination is made about whether an image rotation adjustment should be performed for the image of the beams scanned on the target. In a sixth block 112, if a determination is made that a rotation adjustment should be performed, the rotation adjustment is applied in relation to the scanning of the multiple beams per block 106. The performance of the rotation adjustment can be synchronized with the scanning of the multiple beams such that the rotation adjustment is simultaneous with the scanning, close to simultaneous with the scanning, or separate from the scanning. For example, the rotation adjustment can be performed between scanning increments or translations. Moreover, rotation adjustments can be discrete or continuous, after threshold values, or between bracketed values. In some examples threshold values can relate to distances and tolerances associated with the image at the target, while in other examples threshold values relate to movement values, such as position or angle, associated with the beam scanning optics for scanning the beams per block 106.

Figures 6, 7:
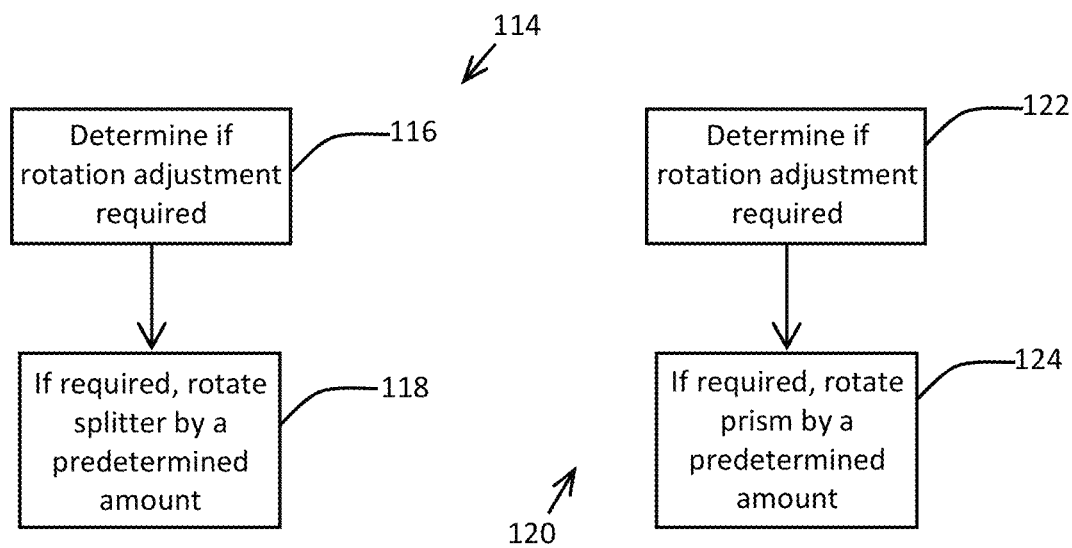
FIG. 6 is a block diagram of an alternative variation of a portion of the method of FIG. 5 in accordance with aspects of the present invention.
FIG. 7 is another block diagram of another alternative variation of a portion of the method of FIG. 5 in accordance with aspects of the present invention.

Alternative variations of a portion of the method of FIG. 5 can be understood with reference to FIGS. 6 and 7. As was described with reference to method embodiment 100 of FIG. 5, in connection with the scanning of the multiple beams per block 106, a determination is made of whether rotation correction is required per block 110. With additional reference to FIG. 6, a method variation 114 is described having a similar step per block 116 for determining whether rotation adjustment is required. If a determination that rotation adjustment is required, in a second block 118 the beam splitter is rotated about an optical axis to counter-rotate or rotationally adjust the image of the beams at the target. With additional reference to FIG. 7, another method variation 120 is described having a similar step per block 122 for determining whether rotation adjustment is required. If a determination that rotation adjustment is required, in a second block 124 an image rotation optic is rotated about an optical axis to counter-rotate or rotationally adjust the image of the beams at the target.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

The invention claimed is:

1. An image compensated multi-beam system, comprising:
    a beam splitter situated to receive an input light beam and split the input light beam into a plurality of processing light beams;
    a galvo scanner including a pair of angularly controlled scan mirrors situated to receive the plurality of processing light beams and to scan the processing light beams across an arbitrary scan path in a processing field of a stationary target so as to process the stationary target across the arbitrary scan path; and
    an image compensation subsystem configured to selectively adjust the rotation of an image of the plurality of processing light beams at the stationary target by an image rotation adjustment angle about a propagation axis of the processing light beams according to a rotation angle of at least one of the angularly controlled scan mirrors so as to reduce an image rotation error caused by the rotation angle of the at least one angularly controlled scan mirrors.

2. The system of claim 1 wherein the input light beam is a pulsed laser beam.

3. The system of claim 1, wherein the image compensation subsystem is situated to selectively rotate the beam splitter about the propagation axis of the processing light beams.

4. The system of claim 1, wherein the beam splitter is a diffractive optical element.

5. The system of claim 1 further comprising an image rotation optic and wherein the image compensation subsystem is configured to selectively rotate the image rotation optic about one or more axes.

6. The system of claim 5 wherein the image rotation optic is one of a dove prism, Pechan prism, roofless Abbe prism, cylinder lens telescope, or a 3-mirror reflective version of a roofless Abbe prism.

7. The system of claim 1, wherein the image compensation subsystem provides an image correction of not greater than 25 μm.

8. The system of claim 1, further comprising an Fθ lens having a field of view and that is situated to telecentrically image the plurality of processing light beams to the stationary target within the field of view.

9. The system of claim 1, wherein the image rotation error is not greater than two degrees across the processing field in which the beams are scanned and is selected based on a position of the image in the processing field or the rotation of the at least one scan mirror.

10. The system of claim 1, wherein the image rotation error includes a clockwise image rotation or a counterclockwise rotation depending on the position of the plurality of processing light beams in the processing field.

11. A method for compensating a multi-beam image, comprising:
    splitting an input light beam into a plurality of processing light beams with a beam splitter;
    receiving the plurality of processing light beams with a pair of angularly controlled scan mirrors;
    scanning an image of the plurality of processing light beams across an arbitrary predetermined scan path across a processing field of a stationary target with the pair of angularly controlled scan mirrors so as to process a predetermined area of the target along the arbitrary predetermined scan path; and selectively adjusting the rotation of the image of the plurality of processing light beams at the stationary target by an angle about a propagation axis according to a mirror rotation angle of at least one mirror of the pair of angularly controlled scan mirrors that corresponds to a position of the processing light beams in the processing field at the stationary target so as to correct an image rotation error of the image that varies across the processing field and that is caused by the mirror rotation angle of the at least one mirror.

12. The method of claim 11 wherein the input light beam is a pulsed laser beam.

13. The method of claim 11, wherein the selective adjustment is performed through rotation of the beam splitter about the propagation axis of the processing light beams emitted from the beam splitter.

14. The method of claim 11 wherein the beam splitter is a diffractive optical element.

15. The method of claim 11, wherein the selective adjustment is obtained by rotating a rotation-correcting image rotation optic disposed in the path of the plurality of processing light beams.

16. The method of claim 15, wherein the rotation-correcting image rotation optic is one of a Dove prism, Pechan prism, roofless Abbe prism, cylinder lens telescope, or a 3-mirror reflective version of a roofless Abbe prism.

17. The method of claim 11, wherein the image compensation system provides an image correction of not greater than 25 μm.

18. The method of claim 11, further comprising determining whether a selective rotation adjustment is required to correct a rotation error associated with the image before selectively adjusting the rotation of the image.

19. The method of claim 11, wherein the selectively adjusting the rotation includes selectively adjusting the rotation based on one or more threshold values associated with the image or the pair of angularly controlled scan mirrors.

20. The method of claim 11, wherein the scanning the plurality of processing light beams with the pair of angularly controlled scan mirrors is temporally separate from the selectively adjusting the rotation of the image of the plurality of processing light beams at the target.

21. The method of claim 11, wherein the plurality of processing light beams is diffracted into a two-dimensional array of processing light beams.

22. The method of claim 11, wherein the image rotation error is not greater than two degrees across the processing field in which the beams are scanned and is selected based on a position of the image in the processing field or the mirror rotation.

23. The method of claim 11, wherein the image rotation error includes a clockwise image rotation or a counter-clockwise rotation depending on the position of the plurality of processing light beams in the processing field.

24. A method, comprising:

directing a plurality of processing beams produced with a beam splitting element through an imaging system to form an image in a selected region in a stationary target processing field that is defined by a mirror rotation of at least one corresponding scan mirror of a pair of imaging system angularly controlled scan mirrors of beam scanning optics situated to direct the plurality of processing beams to an arbitrary predetermined position in the processing field;

determining an image rotation error for the image that is caused by the mirror rotation angle of the at least one corresponding scan mirror and that does not exceed two degrees based on the extent of the mirror rotation across the entire processing field;

applying an image counter-rotation based on the mirror rotation angle to compensate for the image rotation error by rotating the beam splitting element or by rotating an image rotation optic; and processing the selected region of the stationary target with the plurality of processing beams by scanning the beams across an arbitrary predetermined scan path with the at least one scan mirror of the pair of imaging system angularly controlled scan mirrors separate from applying the counter-rotation so as to machine features in the selected region that are smaller than the area defined by the cross-section of the plurality of processing beams.

25. The method of claim 24, wherein the imaging system is telecentric.

26. The method of claim 24, wherein the image rotation error includes a clockwise image rotation or a counter-clockwise rotation depending on the position of the plurality of processing light beams in the processing field.

* * * * *